US008506816B2

(12) United States Patent
Mordukhovich et al.

(10) Patent No.: US 8,506,816 B2
(45) Date of Patent: *Aug. 13, 2013

(54) MEMBRANE SEPARATION OF WATER AND FUEL FROM ENGINE OIL IN AN INTERNAL COMBUSTION ENGINE

(75) Inventors: Gregory Mordukhovich, Bloomfield Hills, MI (US); Andrew M. Mance, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 692 days.

This patent is subject to a terminal disclaimer.

(21) Appl. No.: 12/560,470

(22) Filed: Sep. 16, 2009

(65) Prior Publication Data

US 2011/0062082 A1 Mar. 17, 2011

(51) Int. Cl.
*B01D 15/00* (2006.01)
*B01D 53/22* (2006.01)
*B01D 61/00* (2006.01)
*C02F 1/44* (2006.01)

(52) U.S. Cl.
USPC ...... 210/651; 210/649; 210/650; 210/167.02; 210/167.04; 210/167.06; 210/195.1; 123/196 A; 184/6.24; 184/6.21

(58) Field of Classification Search
USPC .......... 184/6.21, 6.24; 123/196 A; 210/641, 210/649, 650, 651, 652, 653, 654, 655, 167.02, 210/167.04, 167.09, 195.1, 195.2, 253, 257.2, 210/210/321.64, 321.72, 321.79, 321.8, 321.88, 210/321.89, 323.2, 333.01, 409, 410, 411, 210/416.5, 500.23, 167.06
See application file for complete search history.

(56) References Cited

U.S. PATENT DOCUMENTS

| 4,512,299 | A | * | 4/1985 | Egan et al. | 123/196 A |
| 4,780,211 | A | * | 10/1988 | Lien | 210/644 |
| 4,846,977 | A | * | 7/1989 | DeVellis et al. | 210/640 |
| 5,149,340 | A | | 9/1992 | Waycuilis | |
| 6,517,725 | B2 | | 2/2003 | Spearman et al. | |
| 2002/0100726 | A1 | * | 8/2002 | Spearman et al. | 210/640 |
| 2008/0283019 | A1 | * | 11/2008 | Arakawa et al. | 123/196 R |
| 2009/0255498 | A1 | * | 10/2009 | Saito | 123/1 A |

FOREIGN PATENT DOCUMENTS

| CN | 101496998 | 8/2009 |
| JP | 2000153101 | 6/2000 |
| JP | 2005000904 | 1/2005 |

* cited by examiner

Primary Examiner — David C Mellon
(74) Attorney, Agent, or Firm — Reising Ethington P.C.

(57) ABSTRACT

Water and fuel contaminating material may be removed from a stream operating engine. A suitable membrane material is supported in a suitable housing. At least a portion of the contaminated oil stream is flowed over one side of the membrane and water and fuel material diffuses through the membrane to its other side where they are gathered and removed from the housing. The water and fuel material may be recovered separately using different membranes or different regions of a membrane. They may be swept from the membrane and housing a flow of air for disposition outside the housing.

9 Claims, 6 Drawing Sheets

MEMBRANE SEPARATION OF WATER AND FUEL FROM ENGINE OIL IN AN INTERNAL COMBUSTION ENGINE

TECHNICAL FIELD

This disclosure pertains to methods and apparatus for separating water and gasoline (or other fuel) from lubricating oil that is circulating in an operating engine. More specifically, this disclosure pertains to methods for using apparatus in which oil is circulated along surfaces of membranes, and water and fuel constituents such as gasoline, diesel fuel or ethanol are selectively removed from the oil through the membranes. In general, the water and fuel constituents are removed in separate streams of flowing air from membrane surfaces.

BACKGROUND OF THE INVENTION

Most automotive vehicles are powered by internal combustion engines comprising several complementary cylinders in which closely fitting reciprocating pistons accommodate the introduction of a fuel-air mixture, the compression of the mixture, the combustion of the mixture, and the exhaust of combustion products. The fuel may be gasoline, diesel fuel, alcohol-fuel mixtures, alcohol, bio-fuel compositions, or other carbon-containing compositions that are combustible with air. Lubrication of moving parts is accomplished with a suitable hydrocarbon-containing liquid that is pumped from a crankcase at the lower part of the engine and distributed over moving parts of the engine. Circulation of the lubricating oil is completed as it drains back into the sump. The volume of the oil may be several quarts depending on the size of the engine.

At the conclusion of the combustion processes occurring in the respective cylinders, the cylinders will contain a variety of chemical species including water vapor, unburned fuel and particulates. The majority of these will be exhausted from the cylinders during the exhaust stroke but some fraction will be conveyed past the piston rings into the crankcase and into contact with the lubricating oil. Thus, as the engine is operated and the oil is circulated it accumulates particulate matter which may be removed by circulating the oil through a filter. But the oil also accumulates water, un-burned fuel, and other liquid or gaseous combustion by-products which cannot be removed through conventional filtration techniques.

At normal engine operating temperatures these combustion by-products are often sufficiently volatile that they may be ejected from the oil by evaporation. However when an engine is regularly operated for only relatively short periods, particularly at low ambient temperatures, the oil temperature does not increase sufficiently to vaporize and expel these contaminants and they progressively accumulate. This accumulation of water, fuel, and combustion by-products, principally liquids, dilute and contaminate the oil such that it may have to be drained from the engine before its useful properties would have otherwise been depleted. There is a need for a method and device or apparatus for on-vehicle removal of fuel and water from the lubricating oil.

SUMMARY OF THE INVENTION

This invention provides practices for the use of suitable membranes to remove water and fuel (and the like) from lubricating oil as it is being circulated in an operating engine. Membranes are materials of film-like structures that have lateral dimensions much greater than their thickness and that have a composition and microstructure that permit transfer of selected chemical species through their thickness under concentration gradients or other driving forces. While the invention may be practiced on stationary internal combustion engines, it is particularly intended for use on engine-powered vehicles.

In an embodiment of the invention, at least a portion of the stream of circulating engine lubricating oil is caused to flow along the surface of a suitable membrane. The membrane has a first membrane surface for contact with the circulating oil and an opposite membrane surface for recovery of material separated and removed from the oil. The first surface of the membrane is composed to be impervious to the oil composition but the membrane permits passage of at least one of water and fuel molecules dispersed in the oil. The chemical nature of the membrane surface induces and permits molecules of water and/or fuel to diffuse from the flowing oil through the membrane to the opposite surface. In preferred embodiments of the invention, a stream of air is flowed over the opposing surface of the membrane to carry away the penetrate water molecules or fuel molecules (or both) in a permeate stream. The sweeping away of the molecules from the second membrane surface maintains a concentration gradient of contaminant species across the thickness of the membrane that promotes continued separation of water and fuel from the flowing oil stream (the remaining oil stream sometimes called a retentate stream).

In general, it may be preferred to remove water from the oil through a first membrane (or membrane region) and fuel or other carbon-containing contaminants through a second membrane region so that the recovered water and possibly solutes like alcohol and fuel can be handled separately. For example, water removed from the oil may be discarded to the ambient environment; fuel removed from the oil may be stored, such as for reuse in the engine.

In some embodiments of the invention, the membranes may be in the form of flat films that are supported on flat plates. In other embodiments the membranes used for this oil cleansing process may be in the form of hollow fibers where, for example, water and fuel-laden lubricating oil is flowed around the outer circumferential surfaces of a bundle of fibers and air is flowed through the interior hollows of the fibers to remove water or fuel of blow-by products. In still other embodiments, the membranes may be wound in spiral or other suitable configurations. The respective forms of membranes are often supported within suitable metal or polymeric housings or shells that are shaped and constructed to receive circulated oil (containing globules of water and fuel) into the housing, to direct the oil along the upstream sides of the supported membranes, and to permit cleaned oil to exit the housing and rejoin oil being pumped over engine surfaces. It is preferred that the oil flow be turbulent and the invention comprehends the introduction of appropriate baffles or flow modifiers into the oil stream if required to impart turbulence. The housings also permit air (or other sweep fluid) to flow along the downstream (or permeate) side of the housing to remove water and/or fuel constituents. As will be described in more detail below in this specification, the membranes may be composed and supported to remove water and carbon-containing constituents in separate regions of a grouping of membranes surfaces within a housing or in separate groupings of membrane structures located in the same or different housings.

Membrane materials are available for adaptation for separating polar constituents like water and alcohol and non-polar constituents like fuel from working engine oil. Membrane compositions are employed that permit passage of the relatively small water molecules and alcohol molecules but denies diffusion of the engine oil molecules. These may be employed in conjunction with alternate membrane compositions suitable for passage of hydrocarbon fuel constituents but not engine oil. For example, cellulose or cellulose acetate hollow fibers or films may be used. They present a suitable barrier to the engine oil flowing over their surfaces but permit water to separate from the oil stream and transport through the membrane material. Some fuel compositions may also diffuse through cellulose membrane material but 'molecular sieves' like zeolites are preferred. However, membrane materials that deny the passage of lubrication oil may be coated with a layer of hydrophilic composition or oleophilic composition to selectively or successively permit the removal of water and the removal of fuel or blow-by material. Membrane materials and coatings are discussed further in this specification.

As stated above, the membrane structure of this invention is suitable for use in treating engine oil on a vehicle as the engine is operating. The membrane structure complements the function of an engine oil filter for removing particulate contaminants, and may, in some embodiments of the invention, be combined or associated with the filter. The membrane structure may be sized to treat only a portion of the circulating oil stream at any time. Air may be drawn from the engine compartment for carrying water and other permeate materials from the membrane assembly. In some embodiments of the invention, for example during short periods of engine operation, the oil may not be very hot but the membrane may be sized or otherwise adapted to cleanse the relatively cold oil.

Other objects and advantages of the invention will be apparent from descriptions of illustrative embodiments which follow in this specification.

BRIEF DESCRIPTION OF THE DRAWINGS

FIGS. 2A-B show examples of cross-flow membrane separation units suitable for removal of water and fuel from engine lubricating oil.

DESCRIPTION OF ILLUSTRATIVE EMBODIMENTS

Modern internal combustion engines are built to exacting tolerances which demand the use of superior lubricants. To meet this need current engine lubricants comprise a sophisticated blend of base oil and appropriate additives to convey the necessary lubrication performance even after considerable use under a wide range of challenging conditions.

One infrequent condition which is not well addressed by current lubricants or lubrication systems arises when vehicle engines are consistently run for only short times. Under this circumstance the lubricating oil reaches its 'normal' operating temperature only rarely and then only for short periods.

During the combustion process, some 'blow-by' occurs which drives some unburned fuel and moisture past the piston rings into the crankcase, where they are incorporated into the lubricating oil. When the oil is maintained at its 'normal' operating temperature, of between 80 and 110° C., these volatile contaminants evaporate and are removed through the crankcase ventilation system. However under consistent short engine operating cycles, particularly under the low ambient temperatures encountered during winter driving, these contaminants and diluents will accumulate and will, if not removed, rapidly degrade the oil's lubricating capabilities. The accumulation of water may be significant, and water concentrations of 5% or greater in lubricating oil can easily occur under the conditions described, a markedly greater concentration than the desired level of 0.2% or less. If such contaminants cannot be separated and removed from the oil, the only alternative is to change the oil on an accelerated schedule.

Removal of these contaminating liquids will be achieved using semi-permeable membranes which enable selective transport of constituents of the mixture through the membrane. Atoms and molecules may traverse the membrane by physical transport through pores in the membrane or by diffusion through the membrane. Since the objective is to transport water and fuel from the oil in significant quantities so as to maintain them in low concentration in the oil, membranes enabling physical transport are preferred. The performance of different membranes in separating particular combinations of species may be enhanced through appropriate choice of the physical and chemical characteristics of the membrane and may be further modified by application of specific coatings to the membrane. For example in separating water from oil, coatings which are hydrophilic and oleophobic are preferred.

More specifically, coatings that contain groups which are mobile, but highly polar will associate with polar liquids like water and alcohols or with other polar groups. The association of the polar groups with each other will act to minimize permeation by hydrophobic molecules like oil, gasoline or diesel fuel. Non-limiting examples of such groups are: polyols (such as polyvinyl alcohol chains); groups with carbohydrate side chains; polyacrylic acid or derivatives; and polymers containing side chains or side groups with hydroxyl units such as hydroxyphenols or side chains with ammonium units, Ethanol or other alcohols associated with alcohol-blended fuel or E85 fuel will behave similarly to water and will traverse membranes with comparable efficiency to water to create a water-based, alcohol-containing permeate.

Separation of fuel, either gasoline or diesel fuel, from oil is promoted by coatings which are size selective such that the smaller fuel molecules can diffuse through the mesoporous materials while the larger oil molecules (and emulsifiers, viscosity extenders, and other lubricating oil additives) cannot. An example would be zeolites, aluminosilicates which possess a very regular pore structure of molecular dimensions, in which the pore size may be 'tailored' by cation substitution.

Figure 1A:
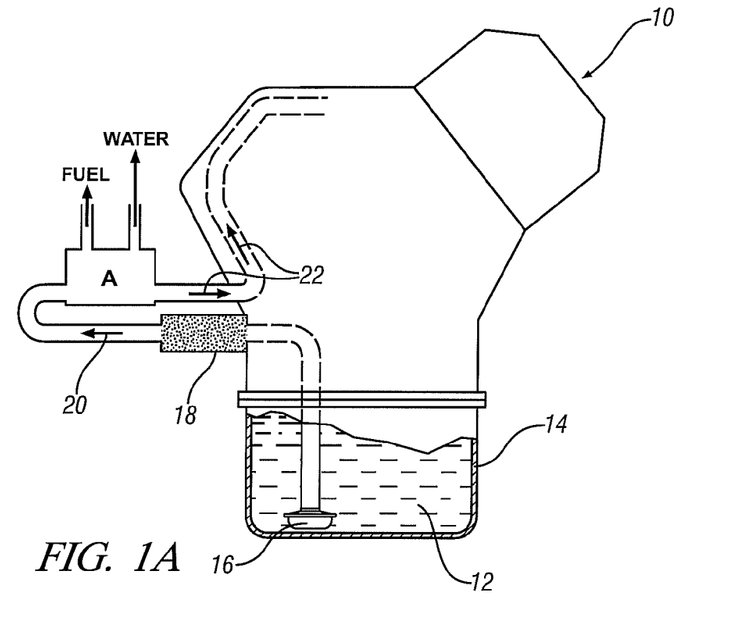
FIGS. 1A-E show an overview of the application of the invention to an operating internal combustion engine and an overview of embodiments of the invention differing in the arrangement of the elements of the invention.

The separation will occur in the lubricating oil circulating in an operating engine. As shown in FIG. 1A, an engine 10 contains a volume of oil 12 contained in sump 14. Under action of a pump (not shown) oil is drawn from the sump through mesh filter/oil inlet 16 and through engine oil filter 18. Engine oil filter 18 may be a conventional spin-on oil filter adapted to the practice of this invention or an oil filter of alternative design likewise adapted to the practice of this invention. The output lubricant flow 20 of the filter 18, comprising oil, water and fuel, but substantially depleted in particulates passes into a fuel and water separator system generally shown as 'A'. Fuel/water separation system 'A' outputs three streams: a fuel stream comprising the fuel or similar constituents removed by a fuel separator; a water stream comprising water and similar constituents, such as alcohols, removed by a water separator; and an output oil stream 22 with reduced levels of water and fuel contaminants. Output oil stream 22 is then delivered to all parts of the engine requiring lubrication such as bearings, cylinders etc. (not shown) and subsequently returns to sump 14.

Since the intent is to separately remove two constituents in the oil, fuel and water, separate and distinct membranes or membrane coatings, each optimized to retain oil but transport either water or fuel are preferred. However where discrimination between fuel and water is achieved through application of coatings to a common membrane, selective coating of designated regions of the membrane to adapt those regions for passage of either fuel or water may be a preferred approach.

Figure 1B:
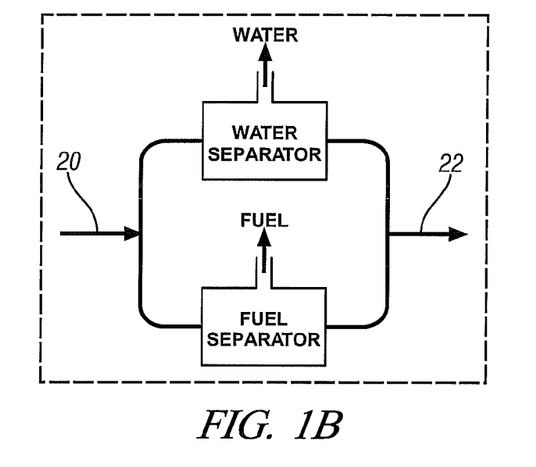
Figure 1C:
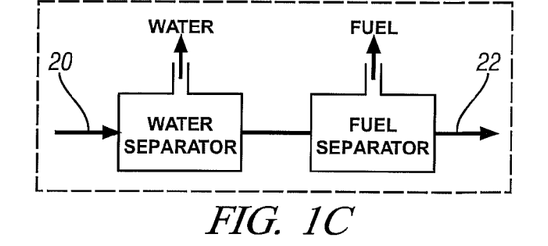
Figure 1D:
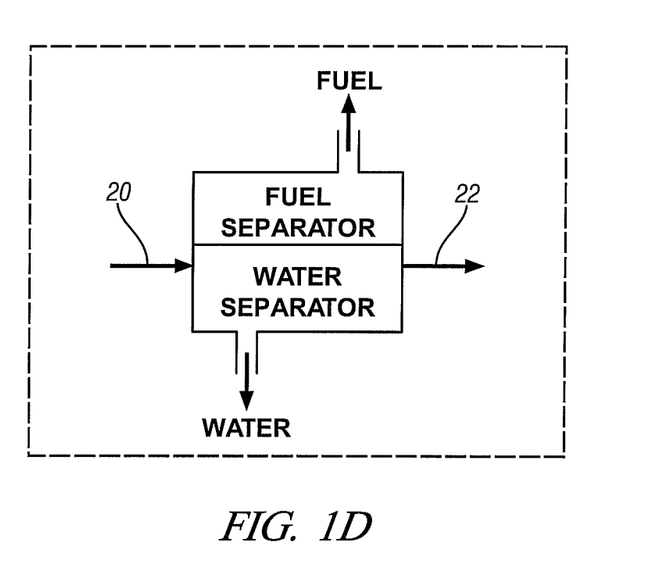
Figure 1E:
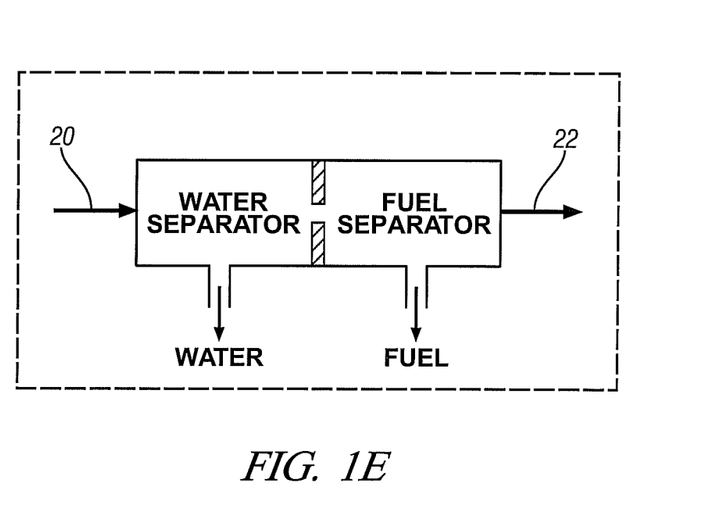

These membranes may be individually packaged and arranged in parallel as indicated in FIG. 1B or arranged in series as illustrated in FIG. 1C where, without limitation or restriction, the water separator is shown as preceding the fuel separator. Alternatively both may be packaged in a single container and arranged for parallel flow as in FIG. 1D or for serial flow as shown in FIG. 1E.

The fuel and water separators comprise a selective membrane or coating which is contacted on one side by the circulating contaminated oil preferably in a cross-flow configuration. The cross-flow configuration is preferred since it has been demonstrated to reduce fouling, or clogging of the membrane pores by deposition of contaminants. The passage of chemical species through the membrane is driven by a pressure gradient, and the selected contaminant, water or fuel, will migrate through the membrane to the other membrane surface The pressure gradient has two sources. First, the concentration gradient which exists across the membrane will give rise to an osmotic pressure. Second, the pressure gradient induced across the membrane due to the oil at its operating pressure on one side of the membrane and the atmospheric pressure sweep gas on the other. At the second membrane surface the concentration gradient is maintained by continually removing the transported species by passing a flow of gas, 'sweep gas', over the membrane surface. The sweep gas will initially contain a less-than-equilibrium concentration of the migrating species, so that it may efficiently accept and transport the migrating species from the membrane surface.

With the wide range of internal combustion engines and fuels in current use, the lubricating oil stream to be treated could comprise gasoline, diesel fuel or ethanol, as well as water. As noted these fuel components may be distinguished based on their polar or non-polar character. The non-polar constituents, gasoline and diesel fuel, comprise mixtures of aliphatic and aromatic hydrocarbons. Gasolines generally comprise alkanes with the number of carbon atoms ranging from 5-12 while diesel fuel comprises chain and aromatic compounds containing 10-20 carbon atoms. Of course, only diesel fuel or gasoline will occur in any one oil volume depending on the engine type.

Figure 2A:
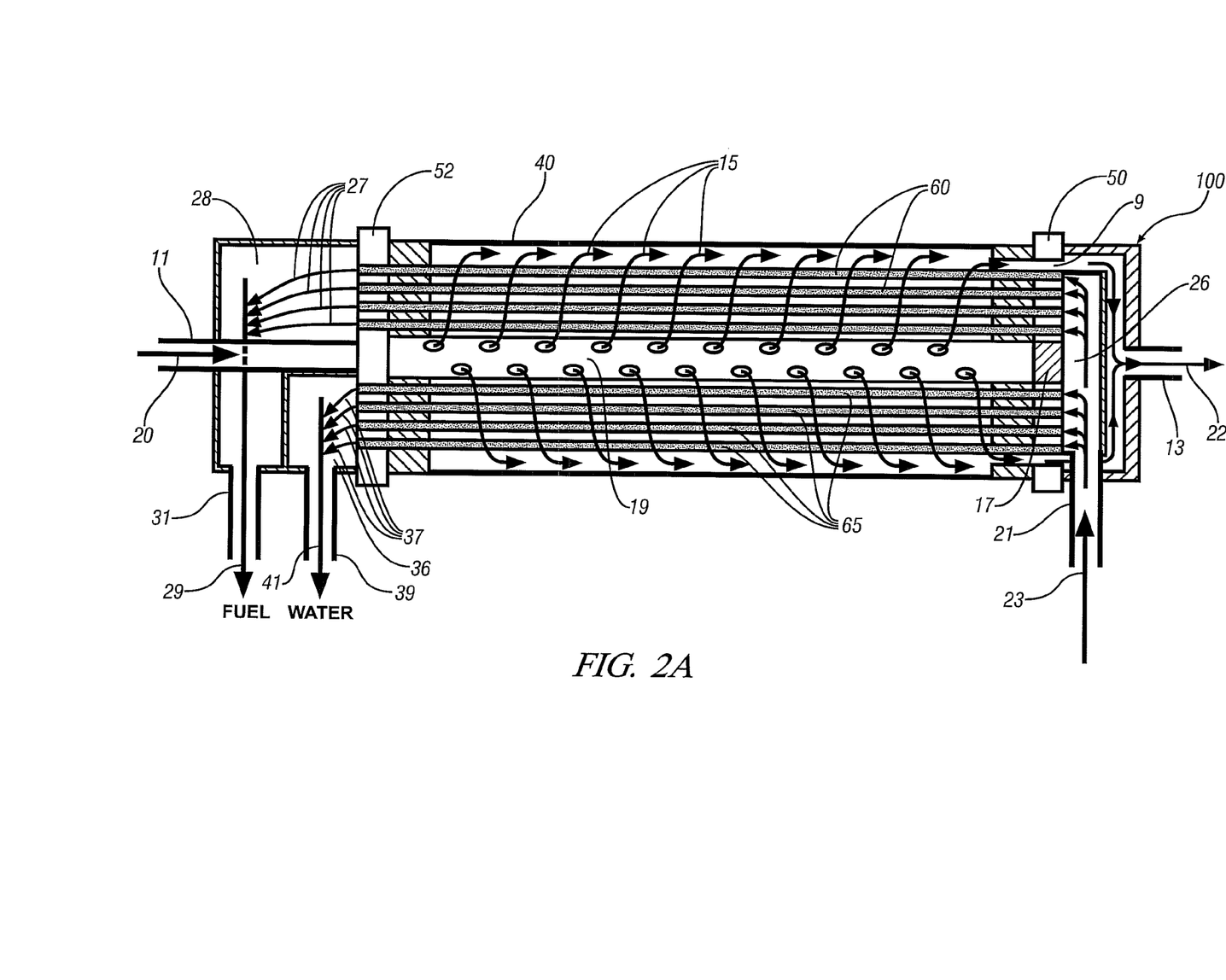
FIG. 2A illustrates an embodiment in which the incoming engine oil circulates and flows around tubular hollow membranes and sweep air is passed through the membranes.

Thus separation of the oil contaminants in a compression-ignition or diesel engine lubricating system will involve separation of diesel fuel and water from the oil. In a spark-ignition engine, separation of water and associated ethanol, if any, and gasoline from the oil will be required. The various contaminants, since they are derived from the gases present in the combustion chamber at the conclusion of combustion, will be present in approximately the concentration in which they occur in the combustion chamber. Since all engines seek to maximize fuel efficiency, water will generally be present in greater concentration in the combustion chamber than unburned fuel in an engine at normal operating temperature. However the fuel concentration will increase during cold engine starting due to the rich fuel-air mixture employed. Under short-trip driving patterns with multiple cold engine start events, comparable accumulations of both fuel and water in oil may result at the end of a winter driving season A suitable cross-flow membrane separator device for simultaneous separation of water and fuel from oil and conforming to the layout illustrated in FIG. 1D is shown in FIG. 2A at 100. The device comprises two sets of inlet flow channels, one for oil and one for sweep gas (e.g., air). Three outlets are provided, one for the outlet oil flow and one each for the fuel- and water-laden sweep gas. These fluid flows do not interact directly and each follows its own prescribed flow path without mixing with the other. The only interaction is the transference of the permeate from the input oil stream to the sweep gas streams mediated by the semi-permeable membrane which separates the flows.

Inlet oil flow 20 under pressure imparted by the oil pump enters through inlet tube 11 and passes to perforated distribution tube 19 which is blocked by endplate 17 and thereby forces the oil flow to break up into a series of flow streams 15. It is expected that the breakup of the oil flow into individual flow streams will beneficially induce turbulence and enhance mass transport in the oil. Alternatively turbulence-inducing features (not shown) may be introduced which will interact with flow streams 15 to increase the turbulence of the flow. Flow streams 15 are circulated around a series of hollow tubular membranes 60 and 65 and directed by shell 40 to pass through opening 13 in endwall 50 to reform into retentate stream 22 and exit through outlet tube 13. Simultaneously a sweep gas flow 23 enters manifold 26 through inlet 21 where it is directed to pass through the hollow cores of tubular membranes 60 and 65 which are secured in endwall 50 and open to manifold 26. Tubular membranes 60 are suited for transfer of fuel while tubular membranes 65 are suited for transfer of water. The sweep gas will carry any permeate, water or fuel, down the length of the fibers 60 and 65. The other end of the fiber 60 is secured in endwall 52 but open to manifold 28. The individual fuel permeate-carrying sweep gas streams 27 on exiting tubular membranes 60 enter manifold 28 where they reform into fuel flow stream 29 which exits the device through outlet 31. In similar fashion, the other end of tubular membranes 65 are likewise secured in endwall 52 but open to manifold 36. The individual water permeate-carrying sweep gas streams 37 exit tubular membrane 65 and reform into water flow 41 in manifold 36. Water flow 41 subsequently exits the device through outlet 39.

It will be appreciated that the configuration shown in FIG. 2A may, with only modest modification be 'inverted', so that the oil flows are directed along the interior of tubular membranes 60 and 65 while physically separated flows of sweep gas are apportioned to pass over the exterior of the membranes. It will however be appreciated that tubular membranes of small interior dimensions, such as less than 1 millimeter in diameter, it will be challenging to induce turbulent flow.

Figure 2B:
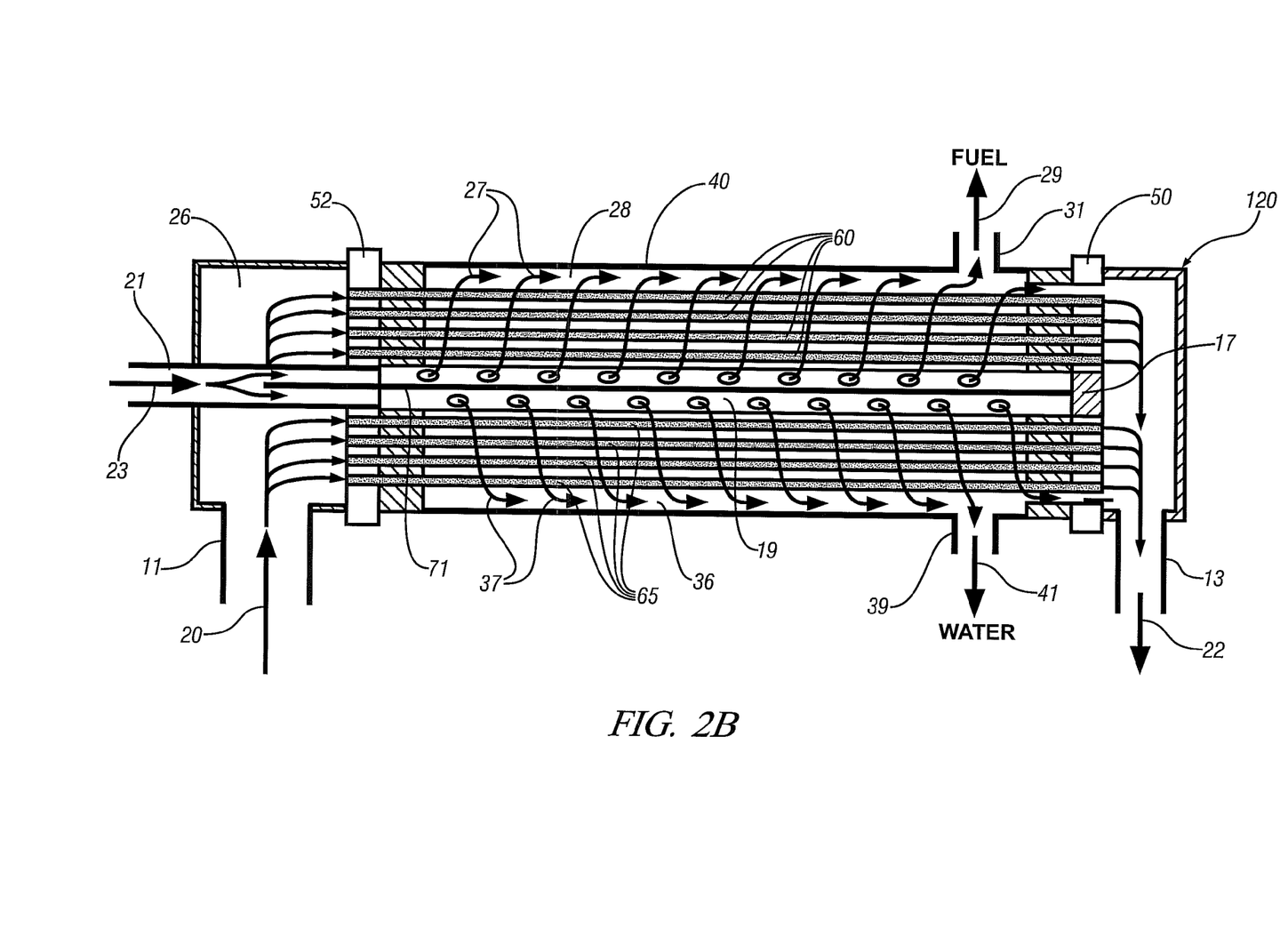
FIG. 2B illustrates an embodiment in which the incoming engine oil passes along tubular hollow membranes and sweep air is passed around the membranes. In each embodiment separate groups of membranes are provided, each group tailored for either fuel and water removal and each participating in an individual sweep air flow path.

This configuration is shown in FIG. 2B where like numbers are used for like elements in FIGS. 2A and 2B for ease of comparison. Sweep gas inlet flow stream 23 entering at inlet 21 is divided into two flows by partition 71. The divided flows are directed into perforated pipe 19. Due to blockage 17 the flows in perforated pipe 19 are directed across the tubular membranes 60 and 65, optimized for transport of fuel and water respectively. After passage through the tubular membranes permeate containing flows 27 and 37 are redirected to manifolds 28 and 36 respectively by outer shell 40. Finally merged flows 27 exit as fuel permeate-containing flow 29 and merged flows 37 exit as water permeate-containing flow 41 while retentate oil exits as flow 22.

Figure 3:
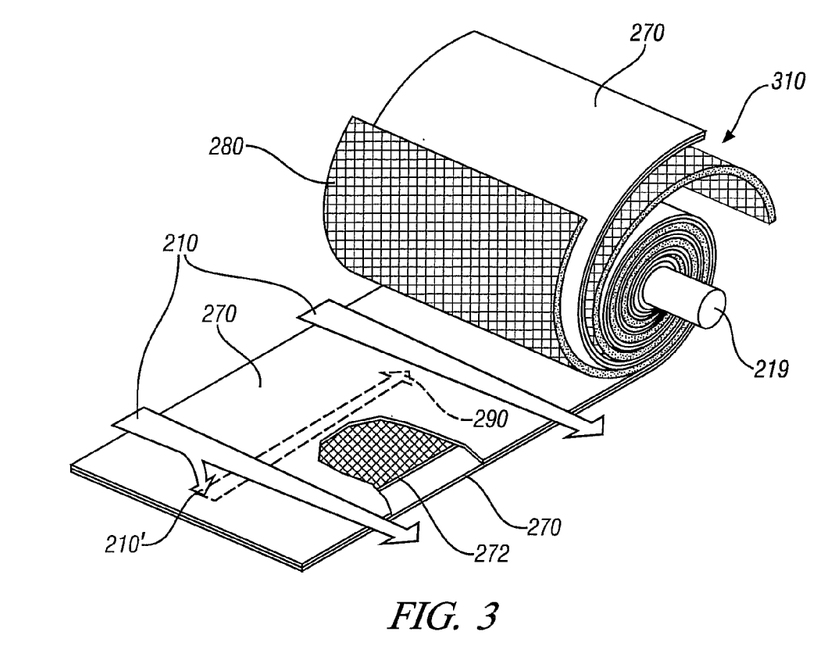
FIG. 3 shows the detail of the membrane configuration of a spiral wound cross-flow membrane separation unit.
Figure 4:
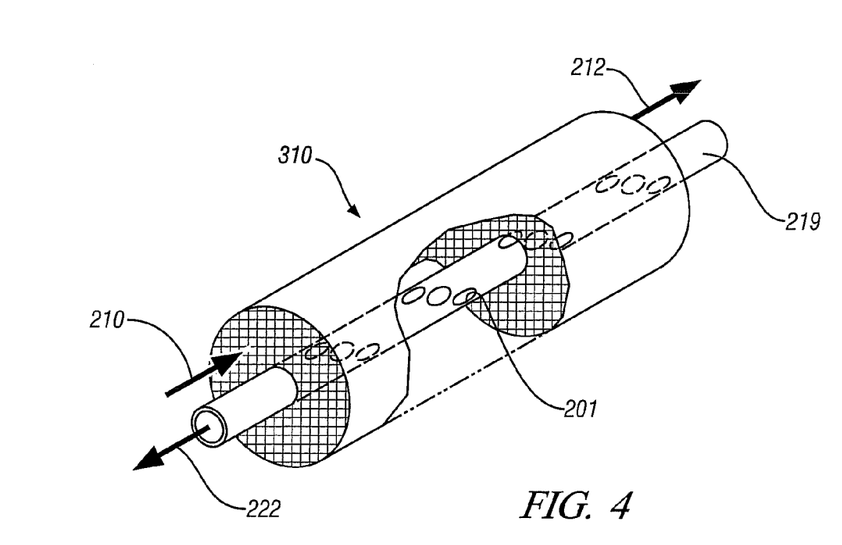
FIG. 4 shows a perspective view, in partial cut-away, of an assembled spiral wound cross-flow membrane separation unit.

Still alternate configurations may be employed. FIG. 3 illustrates the structure of a spiral wound membrane separator 310. This comprises a perforated permeate collection tube 219 around which is wrapped, in spiral fashion, a sequence of layers comprising two membranes 270 separated by a membrane separator 272. The two membranes 270 and membrane separator 272 constitute a basic unit of the filter and they in turn are separated by feed spacer 280. Separators 272 and 280 are suitably configured to create flow passages which will at least not impede fluid flow, and, more desirably, will promote flow. Several such layer groupings may be terminated at different radial positions on collection tube 219 such that the membrane separator of each grouping is aligned with at least one of the perforations of collection tube 219. A partial cutaway perspective view of the wrapped filter is shown in FIG. 4 and illustrates the perforations 201 of collection tube 219.

In operation, referring again to FIG. 3, the oil inlet flow is represented as 210 and flows parallel to the permeate collection tube 219 in the gap between adjacent membranes 270 created by flow spacer 280. Some portion 210' of the inlet oil flow 210 transits membrane 270 where it is wicked or conveyed by capillary action toward collection tube 219 as flow 290. On reaching collection tube 219 the permeate flow 290 passes through pores 201 into the interior of collection tube 219 where it will be subject to vacuum or to sweep gas flow 222 and carried away. FIG. 4 illustrates a countercurrent flow of inlet oil and sweep gas but co-current flow is also acceptable.

Figure 5:
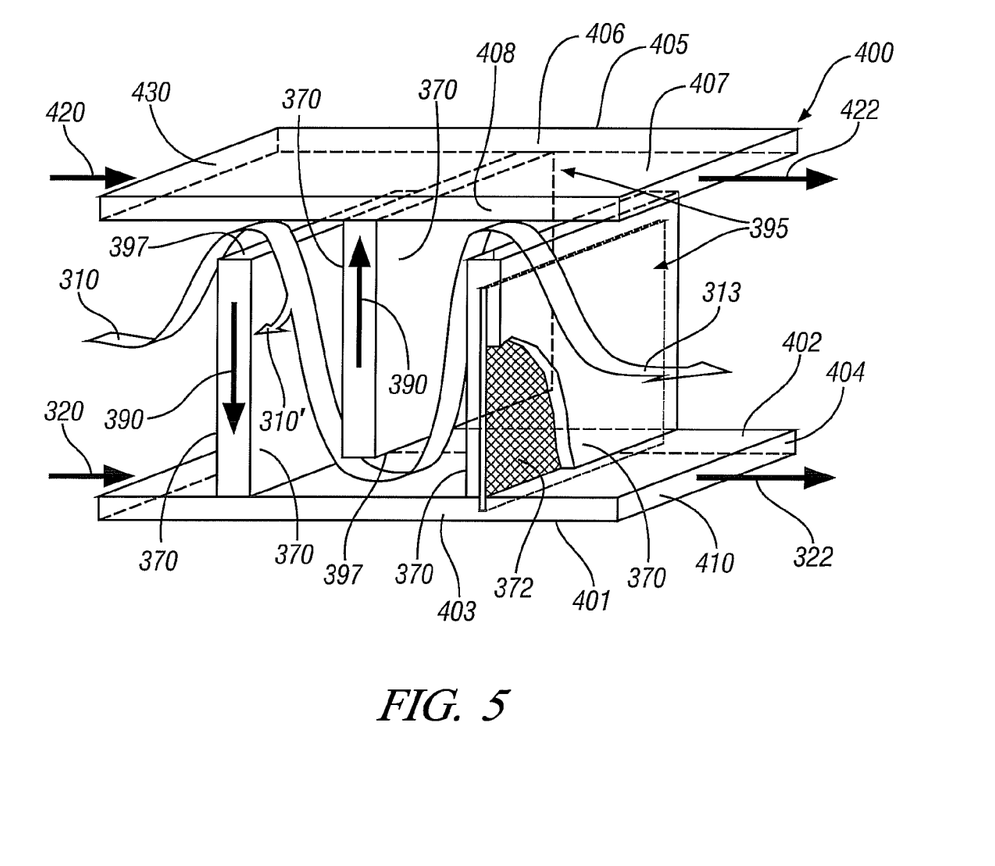
FIG. 5 shows in perspective view the general structure of a portion of a cross-flow membrane separation unit utilizing plate and frame construction. The flow paths of the oil mixture and sweep air are indicated.

A portion of a device employing a yet additional membrane configuration is illustrated in FIG. 5. It will be appreciated that the portion shown may be replicated as many times as necessary and the portions attached, end to end to fabricate the complete device. This device employs generally planar membranes and is therefore more suitable for membranes of limited elasticity which cannot be formed into tubes or bent into a spiral configuration. Further the generally planar membranes may be readily supported on a suitable substrate enabling the membrane to accommodate higher oil pressures for promoting more rapid separation. Inlet oil flow 310 is constrained to a generally rectangular channel formed by upper wall surface 407 and lower wall surface 401 as well as lateral walls which have been omitted for clarity. Also, this plate and frame membrane separator construction directs oil flow 310 along a convoluted path which continually channels the flow between pairs of membrane structures 395 which extract permeate from the flow and producing permeate-depleted exit oil flow 313. The repeated flow reversals resulting from this geometry are very effective in promoting the desired turbulence and therefore for promoting mass transport in the oil. Each of membrane structures 395 comprises a pair of membranes 370 separated by a membrane separator 372 (for clarity shown in partial cutaway in only one of membrane structures 395) which, as in spiral wound filter 300, serves to transport the permeate by capillary action to manifolds 410 and 430. The membrane structures 395 are sealed on one end by panel 397 and on their edges by the lateral walls (not shown). Membrane structure 395, and more particularly separator 372 are open to manifolds 410 and 430 formed by the double panels 401 and 402 and 406 and 407 in cooperation with side closure segments 403 and 404 and 405 and 408. Some permeate portion 310' of oil flow 310 is transported across any of membranes 370 and wicked or transported by capillary action shown at arrow 390 to manifolds 410 or 430. Manifolds 410 and 430 channel sweep gas flows 420 and 320 across the permeate-transporting membrane separator 372 leading to evaporation of the permeate and its incorporation in the sweep gas which exits as permeate-containing flows 322 and 422. Two individual manifolds, 410 and 430 have been shown for clarity but only modest adjustment to the arrangement shown would enable the use of a single manifold. Specifically, if membrane structures 395 extended from surface 407 to 402 and accommodated oil flow by having asymmetrically located flow through passages, a single manifold could be employed.

Further it will be appreciated that although the membranes have been designated by a common number (370) in FIG. 5 implying identical membrane chemistries in each of the membrane structures 395, it would be feasible to assign specific membrane chemistries to specific membrane structures. This would be of particular utility if alternate membrane structures were selectively adapted to transport fuel and water. With this configuration one of the permeates would exit the device as flow 322 while the other would exit as flow 422, again enabling simultaneous separation of water and fuel in a single device.

FIG. 5 illustrates a plate and frame configuration of generally rectangular cross-section. Other cross-sections are also feasible. Of particular interest is a circular cross-section since a membrane separator of such cross-section would be a cylindrical device whose inlet could be mated to the output of a current oil filter. Such a combined unit would entail fewer external connections than incorporating a membrane separator elsewhere in the engine oil circulation path. Of course, such an approach is not unique to this configuration and all of the designs indicated in FIGS. 2-5 could be adapted for incorporation into conventional oil filters.

The use of a membrane separator to separate oil and water may be illustrated through consideration of the following illustrative, non-limiting example. In all cases a volume of 250 mL of test mixture was prepared using a 5W-30 lubricating oil with a carbon range of 40-100 employed and water. The nominal water concentration ranged from about 1 percent to 4.5 percent by weight with the majority of testing conducted using nominal water contents of 2 percent by weight, and the mixture was continually agitated to maintain the water as an emulsion. Typical oil flow rates ranged from 1.0 to 2.3 grams per minute and testing was conducted at temperatures ranging from about 25° C. to 80° C., with particular attention paid to results obtained at a nominal temperature of 65° C. All tests were conducted using sweep air at a flow rate of 100 cm³/min. The overall mass transfer coefficient $K_f$, with dimensions centimeters/second was used as a figure of merit to rank system performance.

Example

Cross-flow test modules in the design shown in FIG. 2 were fabricated using regenerated cellulose fiber obtained from Membrana/Celgard, Germany. The fibers had an inner diameter of 200 micrometers, a wall thickness of 8 micrometers, an effective pore diameter of 4-6 nanometers and a glass transition temperature of greater than 150° C. The test modules comprised a bundle of 300 fibers 16 cm long and the test mixture was continually circulated through the fibres at a flow rate of about 1.5 grams/minute under passage of sweep gas. At about 65° C., under an initial water content of 2.1 percent by weight an overall mass transfer coefficient of about $7.0 \times 10^{-5}$ centimeters per second was observed. Further, increasing the oil flow indicated that further performance improvements were possible and an overall mass transfer coefficient of about $7.0 \times 10^{-5}$ centimeters per second was observed at an oil flow rate of about 25 grams/minute.

The results described above were obtained using only a small volume of oil and a limited number of fibers. The results may however be scaled to conditions more typical of an operating engine environment through knowledge of the membrane surface area. Such scaling suggests that a cross-flow separator fabricated with about 4800 $cm^2$ of the membrane employed in the previously-cited example would be capable of removing most of the water in five quarts of engine oil in less than one hour. This requirement may be met by numerous variants of the designs shown in FIGS. 2-5 but, by way of example only, one option would be to employ a cross-flow filter generally conforming to the design of FIG. 2 but containing about 3000 fibres each about 25 centimeters long. These could be readily packaged in a 4 centimeter diameter container.

Similar scale-up in sweep gas flow will also be required. Generally about 2 L/minute of dry airflow is required. This may be obtained using dessicants or by using regenerative dessicant dryers. Both however increase vehicle mass and simple dessicant-based approaches require that the dessicant cartridges be periodically replaced. Regenerative dessicant dryers overcome this problem but require a source of compressed air and thus mandate the addition of a compressor with attendant additional complexity of packaging and increased mass. Thus, preferably, ambient air with some initial water vapor content will be used. It is therefore preferred to pass about 5 L/minute of ambient air. This number may be somewhat reduced by either drawing air from the vehicle engine compartment which will be at slightly higher temperature and thus a slightly lower relative humidity or by drawing air from the vehicle's HVAC system, preferably immediately after the air exits the air conditioner heat exchanger. If engine compartment air is used it may be feasible to operate the system under ram air when the vehicle is underway, particularly at highway speeds, but for consistency of operation under all operating modes, including idling while stopped, fan circulation of the sweep air is preferred. This might be accomplished by diversion of a small portion of the radiator cooling air, but since the radiator cooling fan generally runs only on demand, the fan would not run during engine warm-up, precisely when air-flow is required. Thus it is preferred to use a small separate fan dedicated to the membrane separator. Alternatively, the fuel retentate sweep gas might be 'powered' by engine vacuum and routed into the inlet manifold to contribute the retentate to the engine fuel supply.

Separation of water from oil is facilitated by the difference in size between the small water molecule and the large oil molecules and is further promoted by their differing chemical character, polar for water, non-polar for oil. This difference in polarity enables the use of membranes or coatings which are wet by water but not by oil and thus allow easy access of water to the membrane pores but restrict access by the oil.

However both fuels, diesel fuel or gasoline, are non-polar, so the primary means of differentiating between different molecules to control their permeation rates is by molecular size. The size of organic molecules is frequently suggested by reference to the carbon number, the number of carbon atoms which comprise the molecule. Conformational effects make the carbon number only an indicator of molecule size since it clearly conveys no indication of aliphatic or aromatic character of the molecule. However oil and fuel comprise chemically similar molecules and thus the carbon number will be suggestive of the feasibility of separating these molecules from one another.

In the example provided above employing a 5W-30 oil representative of current automotive lubricating oils, the carbon number of the oil was given as ranging from 40-100. The carbon number of the gasoline used in spark-ignition engines ranges from 5-12 and for diesel fuel in compression-ignition engines from 10-20. Since there is no overlap in size ranges membrane separation is feasible. However the problem may be further simplified since compounds with carbon numbers of less than about 16 are most injurious to the lubricating properties of the oil. Thus even incomplete separation, provided it significantly reduces the lowest carbon number fraction, will serve to extend the useful life of lubricating oil.

Suitable membranes are porous media which may be either organic (polymeric) composites or ceramic such as zeolites or microporous charcoals. For instance molecular sieves based on zeolites are commonly used for segregation of molecules based on their size. These crystals are characterized by a three-dimensional pore system, with pores of precisely defined diameter. This diameter controls the dimensions of the specific molecules which may migrate through the membrane and can be adjusted to precisely-determined uniform openings capable of allowing molecules smaller than the pore diameter to be adsorbed whilst excluding larger molecules. Because different pore sizes may be readily created in synthetic zeolites, zeolites may be readily tailored to provide good discrimination between molecules of different sizes or shapes.

For applications where more compliant membranes, less susceptible to breakage due to mechanical loading are desired, these mineral or carbon-based molecular sieves may be integrated into a polymer film to form composite membranes. Such membranes permit forming membranes of more complex shape but will reduce the effective membrane surface area since the effective region of the total surface area will be reduced in proportion to the fraction of polymer, The output from the overall approach depicted in FIG. 1 is two vapor-containing streams of permeate—either water-rich or fuel-rich. The water stream may simply be vented to air, but the fuel stream should be recycled for use in the engine. An approach involving routing the sweep gas to the engine intake manifold to provide an additional source of fuel has been described previously. An alternative however is to route the sweep gas to the exhaust manifold where it could serve as a reductant for $NO_x$ emissions. This would be of especial value in lean burn engines whose exhaust typically is reductant-poor.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method of removing water and fuel material from a circulating oil stream of an operating internal combustion engine in which the stream of oil is being circulated for lubrication of engine parts, the water and fuel material entering the oil during engine operation, the method comprising:
   diverting at least a portion of the water-containing and fuel-containing circulating oil stream to a first membrane region and a second membrane region, each membrane region being located for receiving the circulating engine lubricating oil stream and having a thickness and first and second opposing surfaces, and flowing the diverted circulating oil stream portion over the first surfaces of each membrane region, the oil flow engaging the first surface of the first membrane region such that some water leaves the oil stream and passes from the first surface to the second surface of the first membrane region and the oil stream engages the first surface of the second membrane region such that some fuel material leaves the oil stream and passes from the first surface to the second surface of the second membrane region;
   removing water from the second surface of the first membrane region;
   removing fuel material from the second surface of the second membrane region; and
   continuing to circulate water-containing and fuel-containing oil over the first and second membrane regions during engine operation.

2. A method as recited in claim 1 in which water removed from the first membrane region and fuel material removed from the second membrane region are separately disposed of during engine operation.

3. A method as recited in claim 1 in which air is flowed over the second surface of the first membrane region to remove water from the second surface of the first membrane region.

4. A method as recited in claim 1 in which air is flowed over the second surface of the second membrane region to remove fuel material from the second surface of the second membrane region.

5. A method as recited in claim 1 in which the first and second membrane regions are on different membranes.

6. A method as recited in claim 5 in which oil flows concurrently over the first and second membrane regions.

7. A method as recited in claim 1 in which the removed water is discharged from the operating engine as vapor.

8. A method as recited in claim 1 in which recovered fuel materials are burned in the engine or the engine exhaust system.

9. A method as recited in claim 1 in which the fuel is a blend that comprises alcohol and alcohol is removed with water from the first membrane region.

* * * * *